United States Patent [19]

Gagnon et al.

[11] Patent Number: 5,114,988

[45] Date of Patent: May 19, 1992

[54] POLYETHER POLYOLS HAVING REDUCED UNSATURATION AND POLYURETHANE FOAMS PREPARED THEREFROM

[75] Inventors: Steven D. Gagnon, Detroit; Oscar M. Grace, Troy; Theodore M. Smiecinski, Woodhaven; Steven E. Wujcik, Romulus, all of Mich.

[73] Assignee: BASF Corporation, Parsippany, N.J.

[21] Appl. No.: 425,077

[22] Filed: Oct. 23, 1989

[51] Int. Cl.⁵ .............................................. C08G 18/48
[52] U.S. Cl. .................................... 521/167; 521/159; 521/163; 521/170; 521/173; 521/174; 528/76
[58] Field of Search ............... 521/167, 163, 159, 170, 521/173, 174; 528/76

[56] References Cited

U.S. PATENT DOCUMENTS

| | | | |
|---|---|---|---|
| 3,535,378 | 10/1970 | Cross et al. | 521/167 |
| 4,314,048 | 2/1982 | Doi et al. | 528/44 |
| 4,374,207 | 2/1983 | Stone et al. | 521/107 |
| 4,495,081 | 1/1985 | Vanderhider et al. | 521/163 |
| 4,689,356 | 8/1987 | Peffley et al. | 521/159 |
| 4,698,410 | 10/1987 | Straehle et al. | 528/76 |

OTHER PUBLICATIONS

Computer Abstract.

*Primary Examiner*—John Kight, III
*Assistant Examiner*—John M. Cooney, Jr.
*Attorney, Agent, or Firm*—William G. Conger

[57] ABSTRACT

Polyether polyols prepared by oxyalkylating a 1,2-diaminocycloalkane have reduced levels of unsaturation and may be used to prepare melamine containing flame retardant polyurethane foams capable of passing California 117 and 133, and other flame tests.

30 Claims, No Drawings

POLYETHER POLYOLS HAVING REDUCED UNSATURATION AND POLYURETHANE FOAMS PREPARED THEREFROM

BACKGROUND OF THE INVENTION
1. Field of the Invention

The subject invention pertains to polyether polyols and the polyurethane foams which may be prepared therefrom. More particularly, the subject invention pertains to certain 1,2-diaminocycloalkane-initiated polyoxyalkylene polymers which have unusually low levels of unsaturation. These polyethers may be used to prepare polyurethane foams without resort to blowing agents containing chlorofluorocarbons.

2. Description of the Related Art

Polyoxyalkylene polyether polyols are well established as raw materials for polyurethane foams. These polyether polyols are easily prepared by the base catalysed addition of an oxirane onto a polyhydric initiator molecule whose active hydrogens are capable of reacting with the oxirane in a ring opening polymerization. Such active hydrogens are generally contained in hydroxyl and amino groups. Oxirane and methyloxirane are the preferred oxiranes, with the former yielding a primary hydroxyl terminal group while the latter yields a secondary hydroxyl group.

It is well known that allylic unsaturation is formed during the polymerization of propylene oxide, and mechanisms for its formation are discussed in *Block and Graft Polymerization*, Vol. 2, Ceresa, Ed., John Wiley & Sons, on pages 17-21. Whatever the mechanism, the ultimate result is the formation of allyloxy groups which serve as monofunctional initiators, the presence of which lowers the theoretical functionality of the polyol. Recently, the development of unsaturation during polyoxyethylation has been established. See, for example, U.S. Pat. No. 4,764,567.

The magnitude of unsaturation and amount of monol in the polyol increases rapidly with increasing molecular weight. Thus, as Ceresa points out on page 20, a polyoxypropylene monol having a molecular weight of 608 had an unsaturation of 0.0063 meq/mole polyol corresponding to 0.0038 moles of unsaturation per mole of polyol, while an identically prepared monol but having a molecular weight 3.3 times higher had an unsaturation 6.3 times higher. As many polyurethane polyols, particularly those for use in flexible foams have molecular weights considerably in excess of 2000, unsaturation becomes a serious problem. For example, a commercial polyether polyol having a molecular weight of 5000, initiated with trimethylolpropane, should ideally have no unsaturation and a functionality of 3. Instead, such polyols typically have unsaturation of 0.068 meq/g polyol, and a functionality of only 2.3, attesting to the large amount of monol present.

Attempts to reduce unsaturation have centered on changing the reaction conditions such as the oxirane addition temperature and the amount and nature of catalyst. Cesium hydroxide and basic barium and strontium catalysts have proven effective, for example. However, in general, no decrease in the unsaturation due to variations in the initiator have been noted.

In addition to lowering the functionality, unsaturation in urethane polyols creates other problems such as development of odor bodies through oxidation, and development of scorch or discoloration during foaming of slabstock. Thus polyether polyols having lower unsaturation than those presently available are desirable.

Polyurethane foams are generally blown with chlorofluorocarbons or mixtures of chlorofluorocarbons and water. All-water-blown foams are rare because of shrinkage and collapse which may occur during foaming, and the change in foam physical properties caused by the presence of large quantities of urea linkages. This is especially true in the flexible foam area where the relatively stiff urea segments produce harder foams which tend also to be non-resilient.

The Montreal Protocol, signed by 24 countries in September of 1987, calls for decreasing chlorofluorocarbon (CFC) use by 50 percent by 1998. However, NASA's Ozone Trends Panel has indicated that even this lowering of CFC use may well be too little, too late. Thus at present, considerable research has been directed to preparing polyurethane foams which require no CFC's or at least reduced levels of CFC's for blowing.

SUMMARY OF THE INVENTION

It has now been surprisingly discovered that polyether polyols having unusually low levels of unsaturation may be prepared under customary reaction conditions, when a select group of initiators are utilized. It has further and unexpectedly discovered that these polyols may be used to form soft, flexible polyurethane foams in an all water-blown system, thus eliminating or seriously reducing the need for CFC's in such foams. It has been further discovered that the use of such polyols in conjunction with conventional graft polyols in flame retardant polyurethane foams containing melamine as the principle flame retardant produces foams which are capable of passing the California T.B. 133 flammability test whereas the same formulations containing traditional polyether polyols instead of the polyether polyols of the subject invention fail this test.

DESCRIPTION OF THE PREFERRED EMBODIMENTS

The polyether polyols of the subject invention may be prepared under ordinary polyoxyalkylation conditions utilizing conventional catalysis by potassium hydroxide, which conditions are well known to those skilled in the art. The use of catalysts such as cesium hydroxide rather than potassium hydroxide would be expected to lower unsaturation even further. In any case, the subject invention polyols are initiated with a substituted or unsubstituted 1,2-diaminocycloalkane having 4 to 8 membered, preferably 5 or 6 membered rings, with 0-3, preferably 0 or 1 lower alkyl ($C_1$-$C_4$) substituents on the ring. The most preferred 1,2-diamino cycloalkane is 1,2-diaminocyclohexane (DACH). The diaminocycloalkanes may contain minor amounts, for example up to about 40 weight percent of other aliphatic amines, particularly 2-methyl-1,5-diaminopentane. Of course, these amine initiator molecules may be used in admixture with conventional initiators. In such cases, however, the unsaturation and other properties of the resultant polyols are expected to be intermediate between the conventional polyol properties and those of the polyols of the subject invention. By the term low unsaturation is meant a level of unsaturation which is lower than when an otherwise identical polyol is prepared using a tetrafunctional initiator which is not a 1,2-diaminocycloalkane.

Preferred polyols based on the aforesaid initiators have hydroxyl numbers from 10 to about 500, preferably from 10 to about 100, more preferably 20 to about 50, and most particularly from 20 to about 35. These polyols may be prepared using oxiranes such as methyloxirane, oxirane, and ethyloxirane. Polyols prepared from methyloxirane and oxirane are preferred, with those containing substantial amounts of methyloxirane most preferred. Such subject invention polyols have unsaturation values generally less than 0.05 meq/g preferably less than 0.04 meq/g, and in particular less than 0.02 and 0.03 meq/g. The amount of unsaturation increases with increasing molecular weight, as is the case with conventional polyols. In any case, the subject invention polyols are expected to have lower unsaturation than otherwise similar polyols prepared from other tetrafunctional initiators such as ethylenediamine, vicinal toluenediamine, and pentaerythritol. The low unsaturation of the subject invention polyols and the foams prepared from them are fully documented in the Examples which follow.

In the more than fifty years since Professor Otto Bayer discovered the addition polymerization reaction leading to polyurethanes (1937), the field of polyurethane polymers has become a well established, mature technology. While the first uses of polyurethanes were in the field of fibers, rigid foams were developed in 1947 and flexible foams in 1952. In the year 1981, world production of polyurethanes exceeded 3 million metric tons.

By the term "polyurethane" is meant a polymer whose structure contains predominately urethane

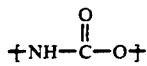

linkages between repeating units. Such linkages are formed by the addition reaction between an organic isocyanate group R—[—NCO]and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, and urea linkages in addition to urethane. The reactions of isocyanates which lead to these types of linkages are summarized in the *Polyurethane Handbook*, Gunter Vertel, Ed., Hanser Publishers, Munich, ®1985, in Chapter 2, pages 7–41; and in *Polyurethanes: Chemistry and Technology*, J. H. Saunders and K. C. Frisch, Interscience Publishers, New Youk, 1963, Chapter III, pages 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

The urethane forming reaction is generally catalysed. Catalysts useful are well known to those skilled in the art, and many examples may be found for example, in the *Polyurethane Handbook*, Chapter 3, §3.4.1 on pages 90–95; and in *Polyurethanes: Chemistry and Technology* in Chapter IV, pages 129–217. Most commonly utilized catalysts are tertiary amines and organotin compounds, particularly dibutyltin diacetate and dibutyltin dilaurate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the —NCO/active hydrogen ratio multiplied by 100. While the extremely large range described previously may be utilized, most polyurethane processes have indices of from 90 to about 120 or 130, and more preferably from 95 to about 110. In the case of polyurethanes which also contain significant quantities of isocyanurate groups, indices of greater then 200 and preferably greater then 300 may be used in conjunction with a trimerization catalyst in addition to the usual polyurethane catalysts. In calculating the quantity of active hydrogens present, in general all active hydrogen containing compounds other then non-dissolving solids are taken into account. Thus the total is inclusive of polyols, chain extenders, functional plasticizers, etc.

Hydroxyl group-containing compounds (polyols) useful in the preparation of polyurethanes are described in the *Polyurethane Handbook* in chapter 3, §3.1 pages 42–61; and in *Polyurethanes: Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene and polyester polyols. The former are generally prepared by well known methods, for example by the base catalysed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di-, and trialkanolamines; tetrahydric initiators such as ethylene diamine, propylenediamine, 2,4'-, 2,2'-, and 4,4'-methylenedianiline, toluenediamine, and pentaerythritol; pentahydric initiators such as diethylenetriamine; and hexahydric and octahydric initiators such as sorbitol and sucrose.

Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example U.S. Pat. Nos. 1,922,451; 2,674,619; 1,922,459; 3,190,927; and 3,346,557.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylene-polyoxypropylene glycols. These lists of dicarboxylic acids and polyols are illustrative only, and not limiting. An excess of polyol should be used to ensure hydroxyl termination, although carboxy groups are also reactive with isocyanates. Methods of preparation of such polyester polyols are given in the *Polyurethane Handbook* and in *Polyurethanes: Chemistry and Technology*.

Also suitable as the polyol are polymer modified polyols, in particular the so-called graft polyols. Graft polyols are well known to the art, and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1-5 and in the Examples of U.S. Pat. No. 3,652,639; in columns 1-6 and the Examples of U.S. Pat. No. 3,823,201; particularly in columns 2-8 and the Examples of U.S. Pat. No. 4,690,956; and in U.S. Pat. No. 4,524,157; all of which patents are herein incorporated by reference.

Non-graft polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20μm, preferably less than 10μm.

Also useful in preparing polyurethanes are monomers containing other functional groups which are reactive with isocyanates. Examples of these are preferably the amines, for example the substituted and unsubstituted toluenediamines and methylenedianilines; the alkanolamines; the amino-terminated polyoxyalkylene polyethers; and sulfhydryl terminated polymers, to name but a few. The alkanolamines and amines, particularly diamines, are particularly useful, as the amino group reacts faster than the hydroxyl group and thus these molecules can act as isocyanate chain extenders in situ without the need to prepare prepolymers. Examples of hindered, alkyl substituted aromatic diamines which are particularly useful are disclosed in U.S. Pat. No. 4,218,543.

Many isocyanates are useful in the preparation of urethanes. Examples of such isocyanates may be found in columns 8 and 9 of U.S. Pat. No. 4,690,956, herein incorporated by reference. The isocyanates preferred are the commercial isocyanates toluene diisocyanate (TDI) methylenediphenylenediisocyanate (MDI), and crude or polymeric MDI. Other isocyanates which may be useful include isophoronediisocyanate and tetramethylxylylidenediisocyanate. Other isocyanates may be found in the *Polyurethane handbook*, Chapter 3, §3.2 pages 62-73 and *Polyurethanes: Chemistry and Technology* Chapter II, §II, pages 17-31.

Modified isocyanates are also useful. Such isocyanates are generally prepared through the reaction of a commercial isocyanate, for example TDI or MDI, with a low molecular weight diol or amine, or alkanolamine, or by the reaction of the isocyanates with themselves. In the former case, isocyanates containing urethane, biuret, or urea linkages are prepared, while in the latter case isocyanates containing allophanate, carbodiimide, or isocyanurate linkages are formed.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the *Polyurethane Handbook* in Chapter 3, § 3.4, pages 90-109; and in *Polyurethanes: Chemistry and Technology*, Part II, Technology.

Polyurethane foams contain an amount of blowing agent which is inversely proportional to the desired foam density. Blowing agents may be physical (inert) or reactive (chemical) blowing agents. Physical blowing agents are well known to those in the art and include a variety of saturated and unsaturated hydrocarbons having relatively low molecular weights and boiling points. Examples are butane, isobutane, pentane, isopentane, hexane, and heptane. Generally the boiling point is chosen such that the heat of the polyurethane-forming reaction will promote volatilization.

The most commonly used physical blowing agents, however, are currently the halocarbons, particularly the chlorofluorocarbons. Examples are methyl chloride, methylene chloride, trichlorofluoromethane, dichlorodifluoromethane, chlorotrifluoromethane, chlorodifluoromethane, the chlorinated and fluorinated ethanes, and the like. Brominated hydrocarbons may also be useful. Blowing agents are listed in the *Polyurethane Handbook* on page 101. Current research is directed to lowering or eliminating the use of chlorofluorocarbons in polyurethane foams.

Chemical blowing agents are generally low molecular weight species which react with isocyanates to generate carbon dioxide. Water is the only practical chemical blowing agent, producing carbon dioxide in a one to one mole ratio based on water added to the foam formulation. Unfortunately, completely water-blown foams have not proven successful in many applications, and thus it is common to use water in conjunction with a physical blowing agent.

Blowing agents which are solids or liquids which decompose to produce gaseous byproducts at elevated temperatures can in theory be useful, but have not achieved commercial success. Air, nitrogen, argon, and carbon dioxide under pressure can also be used in theory, but have not proven commercially viable. Research in such areas continues, particularly in view of the trend away from chlorofluorocarbons.

Polyurethane foams generally require a surfactant to promote uniform cell sizes and prevent foam collapse. Such surfactants are well known to those skilled in the art, and are generally polysiloxanes or polyoxyalkylene polysiloxanes. Such surfactants are described, for example, in the *Polyurethane Handbook* on pages 98-101. Commercial surfactants for these purposes are available from a number of sources, for example from Wacker Chemie, the Union Carbide corporation, and the Dow-Corning Corporation.

Processes for the preparation of polyurethane foams and the equipment used therefore are well known to those in the art, and are described, for example, in the *Polyurethane Handbook* in Chapter 4, pages 117-160 and in *Polyurethanes: Chemistry and Technology*, Part II, Technology, in Chapter VII, §§III and IV on pages 7-116 and Chapter VIII, §§III and IV on pages 201-238.

Flame retardant polyurethane foams may be prepared as taught by U.S. Pat. Nos. 4,745,133, 4,826,884, and 4,849,459, containing an effective amount of melamine, and optionally a second flame retardant, preferably a halogenated phosphate ester flame retardant. Amounts of melamine which may be effective range from 5 to about 55 weight percent based on the weight of the foam, preferably 10 to about 40 weight percent, and more preferably from 15 to about 35 percent. Such foams prepared from the subject invention polyols show surprisingly increased flame resistance as compared to similar foams prepared from other polyether polyols. Such foams are capable of passing, inter alia, the California 117, 133, and the United Kingdom "Crib 5" flammability tests, with the latter two tests requiring higher levels of melamine than the former.

In the following examples, polyols are prepared in accordance with the subject invention. Where appropriate, comparative examples are presented wherein conventional initiators are used to prepare analogous polyols. Hydroxyl numbers are expressed as mg KOH/g polyol.

EXAMPLE 1

A polyether polyol within the scope of the subject invention, but destined for use as an intermediate, was prepared by reacting methyloxirane with trans-1,2-diaminocyclohexane in the absence of catalyst. The autoclave was purged three times with nitrogen and pressure checked. Any water present was removed by stripping at less than 10 torr at 105C for one hour. Methyloxirane was added at <90 psig at an addition temperature of 105C. To one mole of initiator was added 13 moles of methyloxirane. Following oxirane addition, the reactor was vented and discharged. The product had a hydroxyl number of 319, a molecular weight Mp of 716, and a viscosity of 9260 cP.

EXAMPLE 2

Into a 2 gallon stainless steel autoclave were introduced 449 g (0.6 mole) of the polyol intermediate of Example 1, and 33 g (0.25 weight percent) of aqueous 45% KOH. The purge and strip sequence of Example 1 was followed and 4650 g methyloxirane added at <90 psig and 105C. Addition took a total of 12 hours. Following a further four hour reaction period, the reactor was evacuated to 60 torr, held for 15 minutes, pressurized to 34 psig with nitrogen and oxirane added at 105C at <90 psig over a period of 4 hours. Following a 2 hour reaction period at 105C, the reactor was cooled to 60C, vented, and discharged. The product was treated with 3 weight percent magnesium silicate, filtered, and stripped at 100C, < 10 torr for one hour. The polyol had a hydroxyl number of 25.6, an acid number of 0.0, a viscosity of 1614 cP, and an extremely low unsaturation of 0.021 meq/g polyol.

EXAMPLE 3

In a like manner to Example 1, a polyol was prepared from 1 mole 1,2-diaminocyclohexane, 146.5 moles methyloxirane, and 34.5 moles oxirane. The resulting polyether polyol had an acid number of 0.013, a viscosity of 1490 cP, a hydroxyl number of 26.4, and a unsaturation of 0.037 meq/g.

COMPARATIVE EXAMPLE

In a manner similar to that of Example 2, 252 g (0.6 mol) of polyoxypropylated ethylenediamine intermediate was further oxypropylated with 83 mol methyloxirane followed by oxyethylation with 21 mol oxirane. The resultant polyether polyol had a hydroxyl number of 25.3, an unsaturation of 0.053 meq/g polyol, and a viscosity of 1520 cP.

COMPARATIVE EXAMPLE B

In like manner to Example 2 and Comparative Example A a polyol was prepared from polyoxypropylated pentaerythritol. The resulting polyether polyol had a hydroxyl number of 25.9, an unsaturation of 0.059 meq/g polyol, and a viscosity of 1490 cP. Table I documents the unexpected improvement in unsaturation level obtained when the initiators of the subject invention are utilized. Table I indicates that the subject invention polyols have on the average, one third less unsaturation than otherwise similar polyols, prepared using initiators other than 1,2-diaminocycloalkanes.

TABLE I

| | | | Hydroxyl | |
|---|---|---|---|---|
| Example | Initiator | % oxirane | Number | Meq/g polyol |
| 2 | 1,2-diaminocyclohexane | 16 | 25.6 | 0.021 |
| 3 | 1,2-diaminocyclohexane | 15 | 26.4 | 0.037 |
| A | ethylenediamine | 15 | 25.3 | 0.053 |
| B | pentaerythritol | 15 | 25.9 | 0.059 |

EXAMPLE 4

A high resilience flexible foam was prepared from a conventional formulation at an isocyanate index of 85. The isocyanate used was toluene diisocyanate. The polyol component, in parts by weight, contained 100 parts polyol; 1.10 parts BF 2370, a surfactant available from Goldschmidt A.G.; 0.20 parts DABCO ® 33LV catalyst, a 33 percent solution of diethylenetriamine in dipropylene glycol; and 4.5 parts water. No chlorofluorocarbon blowing agent was used. The polyol used was a diaminocyclohexane initiated polyoxypropylene polyol with a hydroxyl number of 25.0 an unsaturation of 0.079 meq/g polyol, and a 2.7% polyoxyethylene cap.

COMPARATIVE EXAMPLES C, D, and E

In a manner similar to Example 4, foams were prepared substituting the ethylene diamine initiated polyol of Comparative Example A; a sucrose based polyol having a hydroxyl number of 33.5 and a 15.0 percent polyoxyethylene cap; and a commercially available polyol believed to be a 17.5% polyoxyethylene capped polyoxypropylene polyether polyol initiated with sucrose or sorbitol and having a molecular weight of about 10,000, for the polyol used in Example 4. Samples of foam were cut and tested. results are presented in Table II below, which shows that the subject invention polyols produce foams which are unexpectedly softer than when other polyols are used in CFC-free formulations.

EXAMPLE 5

Example 4 was run but at a 105 isocyanate index.

EXAMPLE F G, H

Example C, D, and E were repeated by at a 105 isocyanate index.

TABLE II

| Example | TDI Index | Initiator | ILD @ 25% Load | ILD @ 65% Load | Sag Factor | Density lb/ft³ |
|---|---|---|---|---|---|---|
| 4 | 85 | 1,2-diaminocyclohexane | 30.81 | 64.89 | 2.11 | 1.71 |
| C | 85 | ethylenediamine | 38.96 | 78.37 | 2.01 | 1.60 |
| D | 85 | sucrose | 39.42 | 76.42 | 1.94 | 1.91 |
| E | 85 | sucrose? | 46.94 | 97.52 | 2.08 | 1.63 |
| 5 | 105 | 1,2-diaminocyclohexane | 27.45 | 65.19 | 2.37 | 1.58 |
| F | 105 | ethylenediamine | 47.99 | 94.86 | 1.98 | 1.59 |
| G | 105 | sucrose | 44.03 | 85.78 | 1.95 | 1.61 |
| H | 105 | sucrose? | 60.66 | 117.30 | 1.93 | 1.68 |

EXAMPLES 6,7 and I-J

A polyol prepared as in Example 2 of the subject invention, but having an unsaturation of 0.029 meq/g and a hydroxyl number of 28.0, was blended with Pluracol ® Polyol 1146, a commercially available graft polyether polyol containing 40 weight percent of a 3:2 styrene/acrylonitrile dispersion and foamed at a TDI index of 110. For comparative purposes, similar formulations were made substituting PLURACOL ® polyol 816, a glycerin initiated PO adduct having a 16.5% EO cap and a hydroxyl number of 35, for the polyol of Examples 6 and 7. The foams were subjected to the California T.B. 117 Open Flame and Smoldering tests. The results are presented below. All formulations contained, in parts by weight, 4.0 NIAX ® C-175; 5.0 FYROL ® CEF; 1.2 diethanolamine; 6.0 FREON ® F-11; 2.4 water; 0.15 DABCO ® 33LV; 0.05 Niax ® A-1; 1.3 DC-5043 surfactant; and 0.1 T-12 catalyst dissolved in PLURACOL ® polyol 380 at a ratio of 1:1. The results in Table III indicate that while all foams passed both the California 117 and 133 flammability tests at a melamine content of 100 parts melamine per 100 parts polyol, the foams prepared using the subject invention polyols were much softer.

TABLE III

| | Example: | | | |
|---|---|---|---|---|
| | 6 | 7 | I | J |
| Formulation | | | | |
| Pluracol ® polyol 816 | | | 86 | 90 |
| Polyol of Example 2 | 86 | 90 | | |
| Pluracol ® Polyol 1146 | 14 | 10 | 14 | 10 |
| Pluragard ® melamine | 100 | 100 | 100 | 100 |
| Toluene diisocyanate | 36.85 | 36.30 | 38.04 | 37.83 |
| Physical Properties | | | | |
| Density | 3.73 | 3.52 | 3.77 | 3.49 |
| ILD, 25% Load | 29.3 | 26.9 | 39.9 | 34.9 |

TABLE III-continued

| | Example: | | | |
|---|---|---|---|---|
| | 6 | 7 | I | J |
| ILD, 65% Load | 90.8 | 80.1 | 113.8 | 101.0 |
| Sag Factor | 3.10 | 2.98 | 2.85 | 2.89 |
| Flammability Properties | | | | |
| California T.B. 117 Open Flame | pass | pass | pass | pass |
| California T.B. 117 Smoldering (% wt retained. min 80.0%) | 99.4 | 99.0 | 99.3 | 99.0 |
| California T.B. 133 (wool/nylon fabric) | pass | pass | pass | pass |

EXAMPLE 8, COMPARATIVE EXAMPLE K

Foam formulated with similar ingredients to those of the previous examples but being an all water blown system were tested for compliance with the California T.B. 133 flammability test using vinyl fabric covering. The results are presented in Table IV. As can be seen, the subject invention foams passed the California 133 flammability test whereas foams prepared from the conventional polyol failed the test.

TABLE IV

| | Example: | |
|---|---|---|
| | 8 | K |
| Formulation | | |
| Pluracol ® Polyol 1146 | 25 | 25 |
| Pluracol ® Polyol 380 | | 75 |
| Polyol of Example 2 | 75 | |
| Pluragard ® melamine | 30 | 30 |
| Toluene diisocyanate | 32.52 | 32.52 |
| Flammability Properties | | |
| California T.B. 117 Open Flame | pass | pass |
| California T.B. 117 Smoldering | 98.4 | 98.2 |
| California T.B. 133 | pass | fail |

We claim:

1. A polyoxyalkylene polyether polyol prepared by oxyalkylating an initiator molecule comprising a 1,2-diaminocycloalkane having from 4 to 8 carbon atoms in the cycloalkane ring, with an oxirane selected from the group consisting of oxirane, methyloxirane, and ethyloxirane wherein the hydroxyl number of said polyol is from 10 to about 100.

2. The polyether polyol of claim 1 wherein said polyol has an unsaturation, expressed as meg/g polyol, which is less than that of polyols of similar molecular weight prepared from other tetrafunctional initiators when prepared under similar conditions.

3. A polyoxyalkylene polyether polyol having the formula

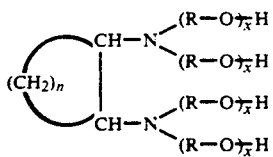

wherein n is a whole number from 2 to 6, where each x individually is a whole number from 1 to about 100, wherein R is selected fro the group consisting of ethylene, methylethylene, ethylethylene, and mixtures thereof; and wherein said polyol has a hydroxyl number of from 10 to about 100.

4. The polyol of claim 3 wherein the hydroxyl number is from about 20 to about 50.

5. The polyol of claim 3 wherein the hydroxyl number is from about 20 to about 35.

6. The polyol of claim 4 wherein from 70 to 96 percent by weight of said polyol comprises ⟨RO⟩ units derived from methyloxirane and from 4 to about 30 percent by weight of said polyol comprises ⟨R—O⟩ units derived from oxirane.

7. The polyol of claim 6 wherein all of said 4 to 30 weight percent ⟨R—O⟩ units derived from oxirane are present as a polyoxyethylene cap.

8. The polyol of claim 6 wherein from 50 to 100 percent of said 4 to 30 weight percent ⟨R—O⟩ units derived from oxirane are present as a polyoxyethylene cap.

9. The polyol of claim 1 wherein said initiator further comprises 2-methyl-1,5-diaminopentane.

10. A polyurethane foam prepared by reacting a di- or polyisocyanate with the polyol of claim 1 in the presence of a blowing agent.

11. A polyurethane foam prepared by reacting a di- or polyisocyanate with the polyol of claim 2 in the presence of a blowing agent.

12. A polyurethane foam prepared by reacting a di- or polyisocyanate with the polyol of claim 4 in the presence of a blowing agent.

13. A polyurethane foam prepared by reacting a di- or polyisocyanate with the polyol of claim 5 in the presence of a blowing agent.

14. A polyurethane foam prepared by reacting a di- or polyisocyanate with the polyol of claim 6 in the presence of a blowing agent.

15. A polyurethane foam prepared by reacting a di- or polyisocyanate with the polyol of claim 7 in the presence of a blowing agent.

16. A polyurethane foam prepared by reacting a di- or polyisocyanate with the polyol of claim 8 in the presence of a blowing agent.

17. A polyurethane foam prepared by reacting a di- or polyisocyanate with the polyol of claim 9 in the presence of a blowing agent.

18. The polyurethane foam of claim 10 wherein said blowing agent consists essentially of water.

19. The polyurethane foam of claim 11 wherein said blowing agent consists essentially of water.

20. The polyurethane foam of claim 12 wherein said blowing agent consists essentially of water.

21. The polyurethane foam of claim 7 wherein said blowing agent consists essentially of water.

22. A flame retardant flexible foam prepared by reacting an isocyanate with the polyol of claim 1 in the presence of a blowing agent, wherein said foam contains from 5 to about 55 weight percent of melamine based on the total weight of the foam.

23. A flame retardant flexible foam prepared by reacting an isocyanate with the polyol of claim 2 in the presence of a blowing agent, wherein said foam contains from 5 to about 55 weight percent of melamine based on the total weight of the foam.

24. A flame retardant flexible foam prepared by reacting an isocyanate with the polyol of claim 4 in the presence of a blowing agent, wherein said foam contains from 5 to about 55 weight percent of melamine based on the total weight of the foam.

25. A flame retardant flexible foam prepared by reacting an isocyanate with the polyol of claim 6 in the presence of a blowing agent, wherein said foam contains from 5 to about 55 weight percent of melamine based on the total weight of the foam.

26. A flame retardant flexible foam prepared by reacting an isocyanate with the polyol of claim 7 in the presence of a blowing agent, wherein said foam contains from 5 to about 55 weight percent of melamine based on the total weight of the foam.

27. A flame retardant flexible foam prepared by reacting an isocyanate with the polyol of claim 8 in the presence of a blowing agent, wherein said foam contains from 5 to about 55 weight percent of melamine based on the total weight of the foam.

28. A flame retardant flexible foam prepared by reacting an isocyanate with the polyol of claim 9 in the presence of a blowing agent, wherein said foam contains from 5 to about 55 weight percent of melamine based on the total weight of the foam.

29. The polyurethane foam of claim 22 wherein said blowing agent consists essentially of water.

30. The polyurethane foam of claim 27 wherein said blowing agent consists essentially of water.

* * * * *